United States Patent [19]

Kunze et al.

[11] Patent Number: 5,450,275
[45] Date of Patent: Sep. 12, 1995

[54] MAGNETIC-TAPE CASSETTE APPARATUS COMPRISING AN AUTO-REVERSE DECK WITH PRESSURE-ROLLER BRACKET ACTUATION

[75] Inventors: Norbert Kunze, Ehringshausen; Dieter Müller, Staufenberg, both of Germany

[73] Assignee: U.S. Philips Corporation, New York, N.Y.

[21] Appl. No.: 113,547

[22] Filed: Aug. 27, 1993

[30] Foreign Application Priority Data

Sep. 9, 1992 [DE] Germany .................. 42 30 126.2
Sep. 9, 1992 [DE] Germany .................. 42 30 128.9

[51] Int. Cl.$^6$ .................. G11B 15/44; G11B 15/295
[52] U.S. Cl. .................. 360/96.3; 242/356
[58] Field of Search .................. 360/96.1–96.3, 360/93, 85; 242/340, 356

[56] References Cited

U.S. PATENT DOCUMENTS

| | | |
|---|---|---|
| 3,402,868 | 12/1966 | Hammond . |
| 4,214,283 | 7/1980 | Fushimi et al. .................. 360/96.3 |
| 4,383,282 | 5/1983 | Osanai .................. 360/96.3 |
| 4,511,939 | 4/1985 | Shinohara .................. 360/93 |
| 4,639,800 | 1/1987 | Tanaka et al. .................. 360/96.2 |
| 5,062,014 | 10/1991 | Yoshimura .................. 360/96.2 |
| 5,140,475 | 8/1992 | Tanaka .................. 360/96.3 |
| 5,144,507 | 9/1992 | Kurita .................. 360/96.3 |
| 5,198,943 | 3/1993 | Kunze et al. .................. 360/96.3 |
| 5,276,567 | 1/1994 | Ohashi et al. .................. 360/96.2 |
| 5,346,156 | 9/1994 | Kunze et al. .................. 360/96.3 |

FOREIGN PATENT DOCUMENTS

| | | | |
|---|---|---|---|
| 0428219 | 5/1991 | European Pat. Off. . | |
| 55-84070 | 6/1980 | Japan .................. | 360/96.3 |
| 2075244 | 11/1981 | United Kingdom .................. | 360/96.2 |

Primary Examiner—A. J. Heinz
Assistant Examiner—Brian E. Miller
Attorney, Agent, or Firm—Brian J. Wieghaus

[57] ABSTRACT

The invention relates to a magnetic-tape-cassette apparatus comprising a deck for magnetic-tape cassettes and constructed for playing and fast winding modes in forward and reverse directions, in which the switching between the forward and reverse tape transport directions is accomplished by means of a switching lever. The switching lever controls pressure rollers mounted on a pivotal bracket which serves to pivot the pressure rollers into and out of engagement with the capstans. The pressure roller bracket includes a fork which is actuated by the movement of the switching lever. The switching lever also carries an intermediate wheel rotatably mounted thereon and a pivoting wheel pivotally mounted on the switching lever which is in engagement with the intermediate wheel. The pivoting wheel is engagement with one of the reel discs when the switching lever is in the forward direction and the other of the reel discs when the switching lever is in the reverse direction. Thus, the switching lever provides both rotation to the reel discs and movement of the pressure rollers into and out of engagement with the capstans.

9 Claims, 5 Drawing Sheets

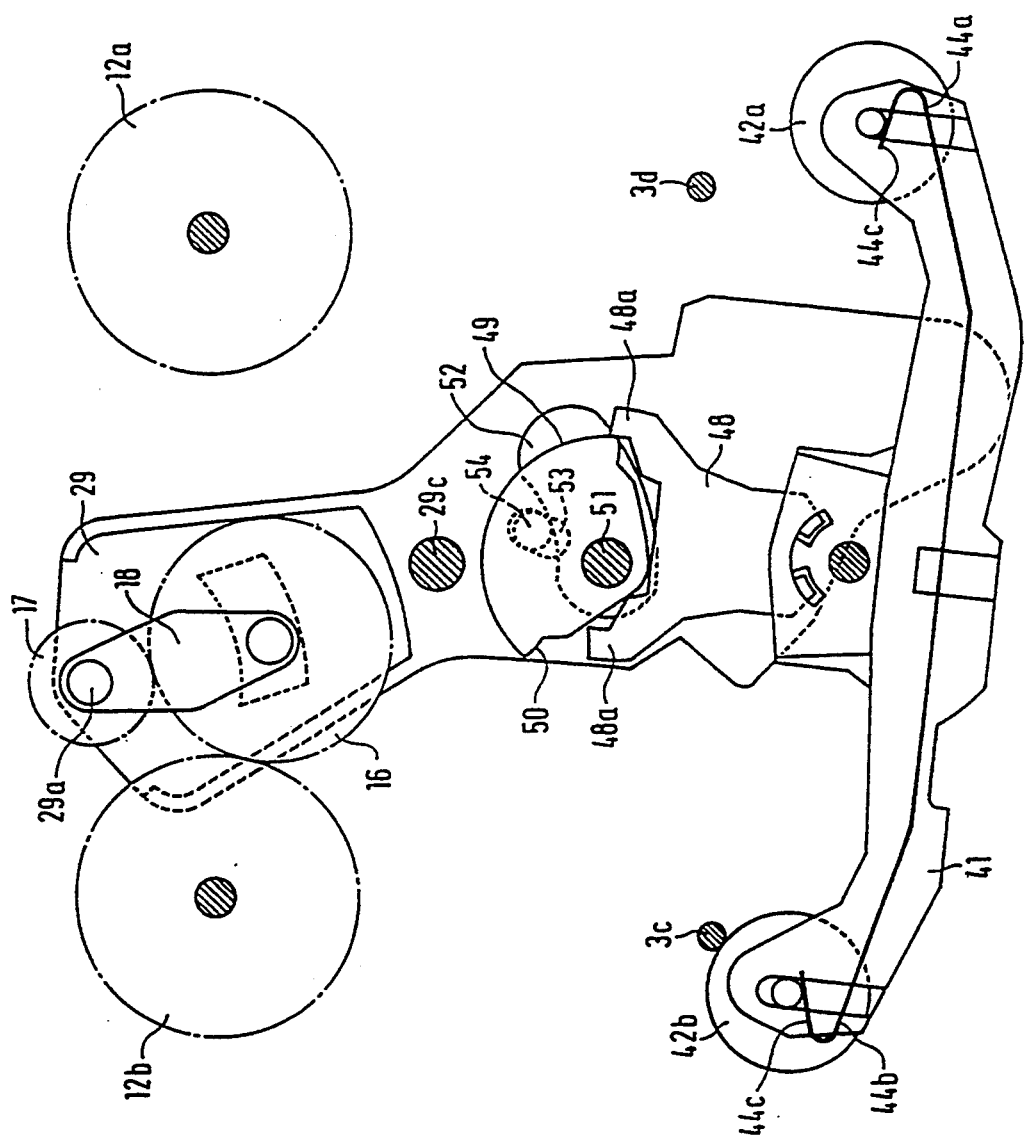

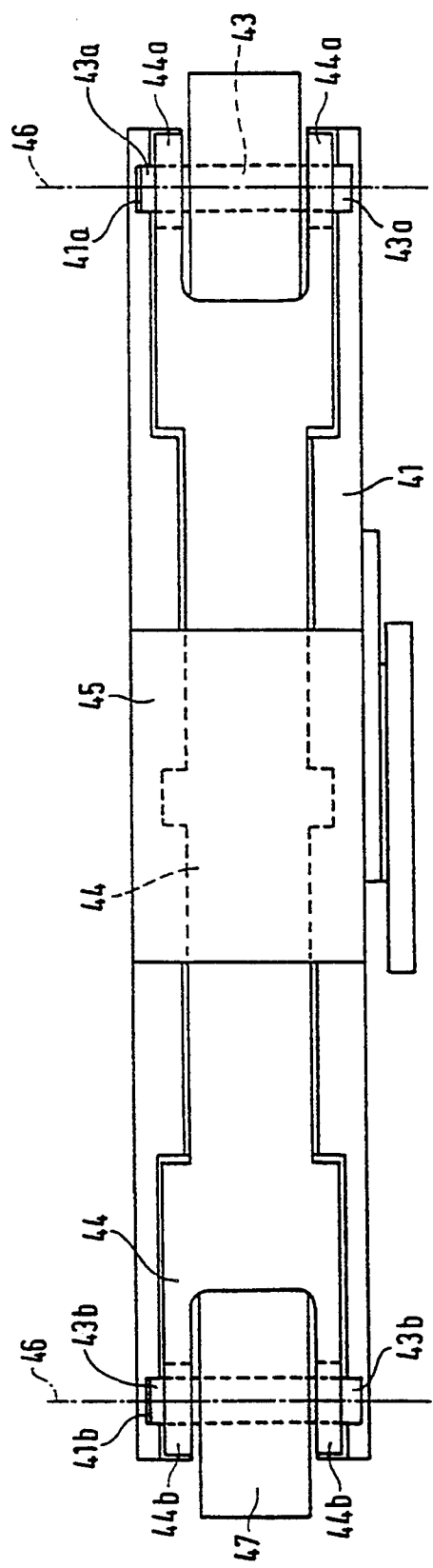

MAGNETIC-TAPE CASSETTE APPARATUS COMPRISING AN AUTO-REVERSE DECK WITH PRESSURE-ROLLER BRACKET ACTUATION

BACKGROUND OF THE INVENTION

The invention relates to a magnetic-tape-cassette apparatus comprising a deck for magnetic-tape cassettes and constructed for playing and fast winding modes in forward and reverse directions, in which
- the play direction is changed by means of a switching mechanism which switches a reel-drive mechanism from one reel disc to the other reel disc of the deck by means of a switching lever towards the end of a switching process,
- pressure rollers can press the magnetic tape against the capstan which provides the transport of the magnetic tape at the time,
- the pressure rollers are supported on a pivotable pressure-roller bracket common to both rollers,
- the pressure-roller bracket is pivoted by means of parts of the switching mechanism.

Such a magnetic-tape-cassette apparatus is known from EP 428,219 A2 (PHD 89-200). This magnetic-tape-cassette apparatus with an auto-reverse deck comprises the two capstans for forward and reverse operation needed in a deck of this type. The magnetic tape is always moved past the magnetic head by means of one capstan or by means of the other capstan. For this purpose there have been provided pressure rollers, of which selectively one roller can be applied to one capstan for one playing direction and the other roller can be applied to the other capstan for the other playing direction.

The reel-drive mechanism, which can drive the tape spools on the reel discs, can be switched over from one reel disc to the other reel disc and back. Switching over is effected by means of a switching mechanism which comprises a central switching lever.

The pressure rollers are supported on a pressure-roller bracket which is common to both pressure rollers and which is arranged on a head support so as to be pivotable about a pivotal axis which extends symmetrically relative to the capstans. The pressure-roller bracket is pivoted by means of a reversing plate which assumes different positions to define the forward and the reverse playing direction of the deck, which positions also dictate the pivotal position of the pressure-roller bracket, a cam of the reversing plate causing the pressure-roller bracket to be changed over when said plate is actuated. The cam cooperates with the head support and thus makes the pivotal position of the pressure-roller bracket dependent upon the position of the reversing plate and the position of the head support.

A cam which can pivot the pressure rollers or their supports by means of slides is known from DE 30 38 380 A1. By means of the slides, which are restrained relative to one another, the cam acts upon the separately supported pressure rollers via separate preloading springs. This construction is intricate and requires a large number of parts.

From U.S. Pat. No. 4,511,939 it is known to effect the change-over of the pressure rollers via a lever system. The pressure rollers themselves are supported on associated separate members. The members for the relevant transport direction are actuated by an intermediate lever which is pivotably supported on the chassis of the deck symmetrically relative to the capstans. The intermediate lever is T-shaped and its base limb has a profiled recess engaged by the transmission pin of a switching lever. This switching lever is pivotably supported on the chassis of the deck and is actuated by means of a winding lever or change-over means which are not described in more detail. This arrangement is not suitable for a compact construction as is required in the case of decks for car-radios, to which the present case pertains.

SUMMARY OF THE INVENTION

It is an object of the invention to use the known switching lever itself with a simple transmission path for changing over the pressure-roller bracket carrying the two pressure rollers.

According to the invention this object is achieved in that
- the pressure-roller bracket comprises a fork whose prongs extend into the operating range of the switching lever,
- the switching lever, when it is pivoted to switch the reel-drive mechanism from one transport direction to the other, cooperates with the prongs in such a manner that at the same time it switches the pressure-roller bracket and hence the pressure rollers from one capstan to the other.

This arrangement has the advantage that the actuating lever, which performs a substantial actuating movement, can transmit an adequate actuating movement to the pressure-roller bracket.

In a further embodiment of the invention, although the switching lever can directly transmit movement to the pressure-roller bracket without any problem, a pivotable actuating lever is arranged in the actuating path between the switching lever and the fork of the pressure-roller bracket. As a result of this, the transmission path becomes shorter. In a further embodiment of the invention the actuating lever is pivotable about a fixed pivot on the chassis, the actuating movements transmitted to the fork being imparted to said actuating lever by the switching lever by means of a pin on the switching lever, which pin engages a longitudinal slot in the actuating lever.

In a further embodiment of the invention the actuating lever has sliding edges along which the prongs can slide to pivot the pressure-roller bracket into the predetermined pivotal position and thereby apply the pressure roller to the capstan. The individual spring arms of the pressure spring then provide the required tolerance compensation.

In a further embodiment of the invention the magnetic tape can be pressed against the capstans by the pressure rollers by means of a pressure spring, the common pressure-roller bracket, which has longitudinal slots in which the spindles of the pressure rollers are movable, being supported on a head support carrying the magnetic head and being pivotable about a spindle which is disposed symmetrically relative to the capstans, and the pressure spring, which acts upon the spindle ends of the two pressure rollers, bifurcates at the location of the pressure rollers and its ends to form two spring arms which individually press against the spindle ends in such a manner that the pressure spring with its spring arms urges the individual spindle ends independently of one another towards the capstans in the longitudinal slots and presses them against said capstans.

The advantage of this construction is that the spring arms of the single pressure spring urge the spindle ends towards the capstans in such a manner that the capstan axis and the pressure roller axis extend substantially parallel to the tape transport direction. The urging means are formed by the spring arms of the pressure spring itself.

The pressure roller surfaces which cooperate with the capstans can then be substantially right-circular cylindrical surfaces. A right-circular cylindrical pressure roller surface means that all the parts of this surface are equispaced from the pressure-roller axis. Thus, the pressure rollers can provide the required pressure over a large surface area.

BRIEF DESCRIPTION OF THE PREFERRED EMBODIMENT

The invention will now be described in more detail with reference to the drawings. In the drawings:

FIG. 1 is a diagrammatic representation of a deck for magnetic-tape cassettes in a magnetic-tape-cassette apparatus with its drive system and pressure-roller bracket set to the forward play direction (NOR), FIG. 2 is a sectional view of the reel-drive mechanism of the deck, FIG. 3 is a diagrammatic representation of the deck shown in FIG. 1, set to the reverse play direction (REV), FIG. 4 is an enlarged-scale representation showing the pressure-roller bracket with pressure spring and the actuating mechanism cooperating therewith in the reverse play direction, and FIG. 5 is a plan view of the pressure spring with its spring arm pairs.

DETAILED DESCRIPTION OF THE PREFERRED EMBODIMENT

Figure 1:
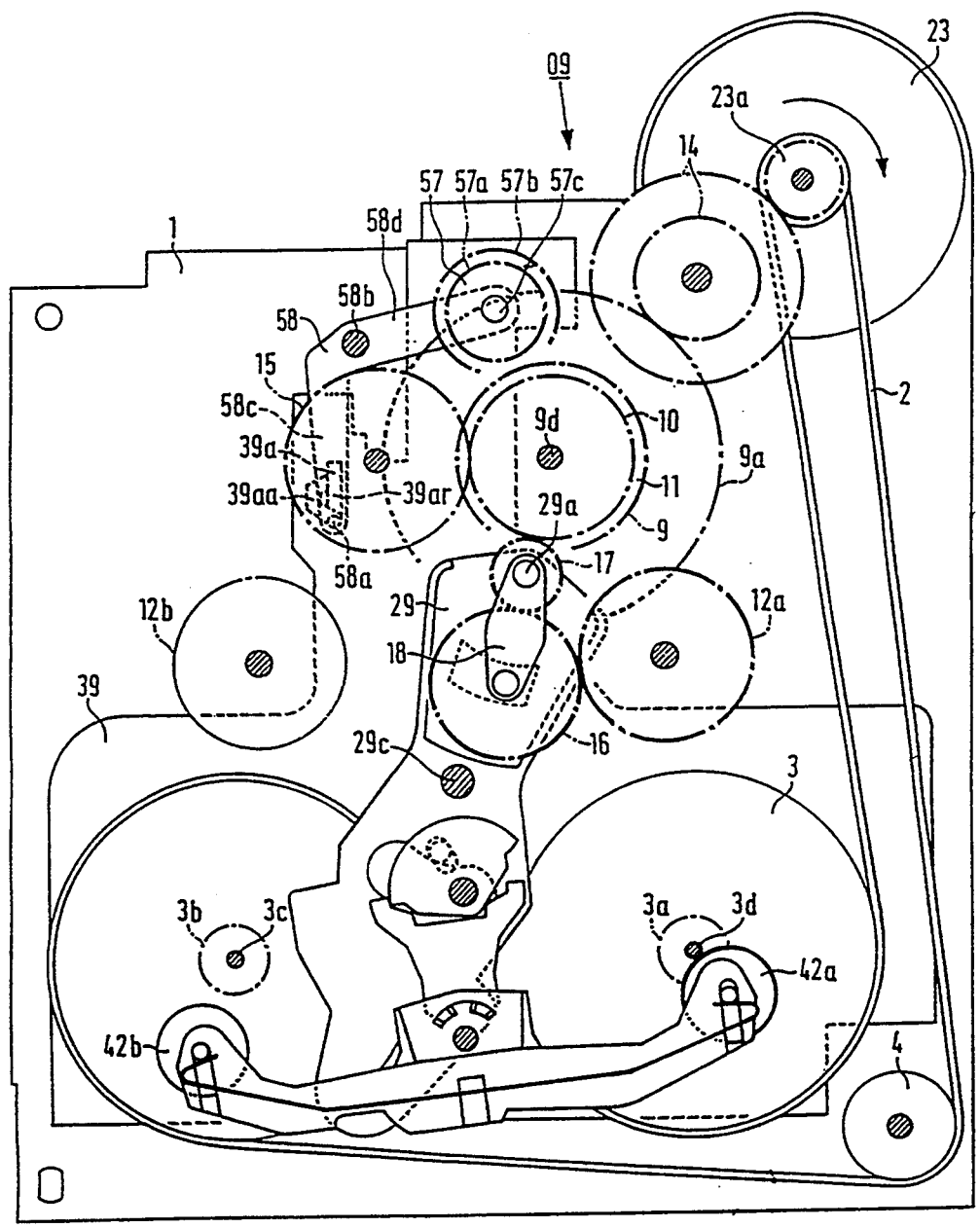

The diagrammatic representation in FIG. 1 illustrates how the movable parts of the deck on a chassis 1 are driven. By means of a belt 2 a motor 23, which rotates in only one direction, drives flywheels 3 for the capstan 3c for reverse play (REV) and the capstan 3d for forward play (NOR) in opposite directions of rotation. The capstans 3c, 3d have teeth 3a and 3b. The belt 2 is passed over a guide roller 4.

Figure 2:
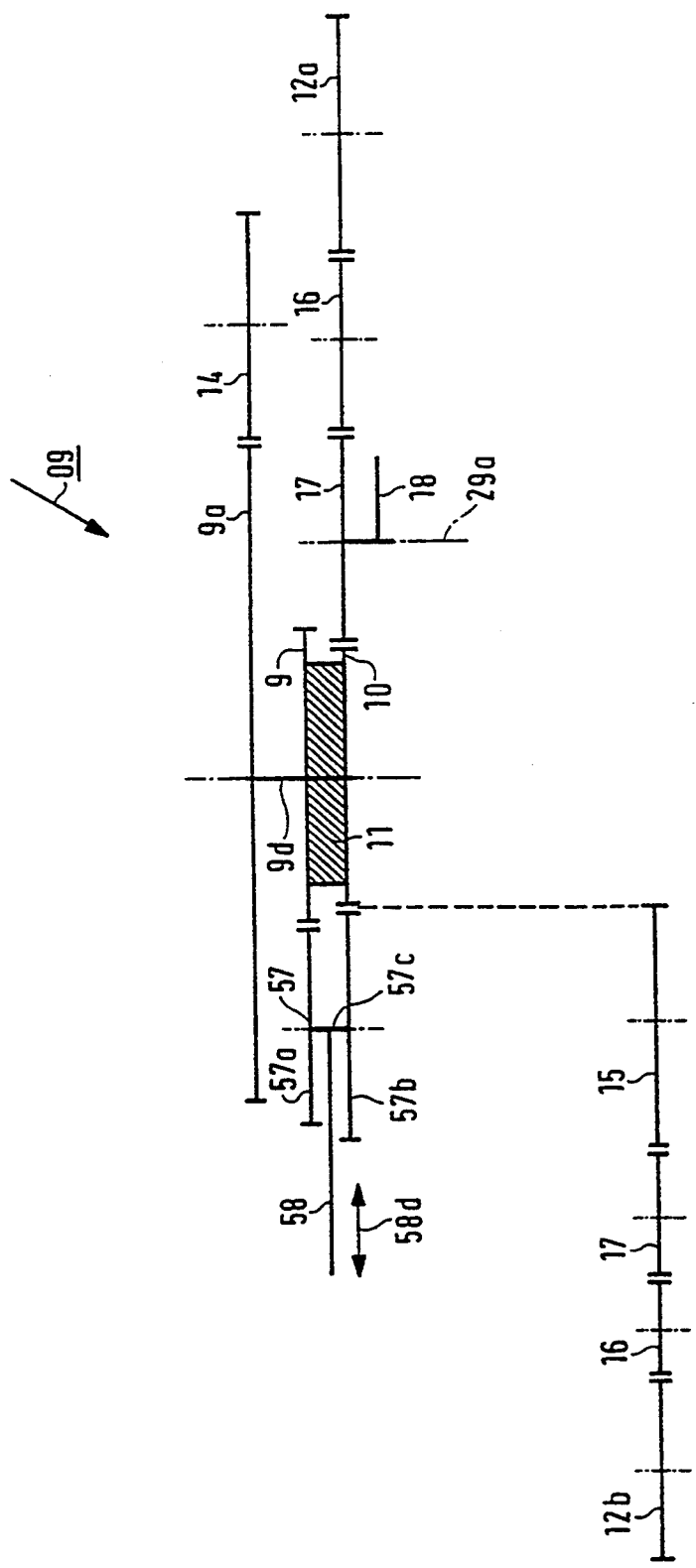

A reel-drive mechanism 09, which is also driven by the motor 23 and is shown in sectional view in FIG. 2, serves to drive the forward reel disc 12a for forward play (NOR) and a reverse reel disc 12b for reverse play (REV). With its shaft 23a the motor 23 drives the play coupling via an intermediate drive wheel 14, which coupling has a primary coupling wheel 9 with a toothed drive ring 9a, which rotates about a spindle 9d as long as the motor shaft 23a rotates. The primary coupling wheel 9 drives a secondary coupling wheel 10, which is concentric therewith, via a friction coupling 11. This may be, for example, a torsion-spring coupling, a felt coupling or an electromechanical coupling.

The secondary coupling wheel 10 is in mesh with an intermediate wheel 17, which is rotatable about a spindle 29a of a switching lever 29. The switching lever 29, which can be set to and held in an end position for forward operation (NOR) and an end position for reverse operation (REV) is then urged clockwise into the NOR position shown in FIG. 1 and anti-clockwise into the REV position shown in FIGS. 2 and 4. The toothed wheel 17 meshes with a toothed wheel 16, which is in mesh with the NOR reel disc 12a in the situation illustrated in FIG. 1.

The meshing forces act on the individual toothed wheels in such a way that the pair NOR reel disc 12a/pivotal wheel 16 is engaging and the pair secondary coupling wheel 10/intermediate wheel 17 is disengaging. In the NOR position shown in FIG. 1 the switching lever 29 is urged clockwise by a switching-lever spring, not shown. The spring load is then such that the switching lever 29 is urged to the right, i.e. clockwise, towards the NOR reel disc 12a.

The reel-drive mechanism 09 comprises a double toothed bypass wheel 57, whose spindle 57c is arranged on a two-arm bypass-wheel lever 58, which is pivotable about a pivot 58b. As is indicated by a double arrow 58d in FIG. 2 the bypass wheel 57 can be engaged with or disengaged from the primary coupling wheel 9 and the secondary coupling wheel 10 in such a way that the coupling 11 is bypassed in the case of engagement and the coupling is operative in the case of disengagement. By means of this bypass wheel 57 the NOR and REV reel discs 12a, 12b can be switched to rapid rotation for the purpose of fast winding. In order to obtain the higher fast-winding speed the transmission ratio has been selected in a such a way that the number of teeth of the primary coupling wheel 9 is larger than the number of teeth of the secondary coupling wheel 10, and that the number of teeth of the bypass wheel 57 meshing with the toothed wheel 9 is smaller than the number of teeth of the bypass wheel 57b meshing with the secondary coupling wheel 10.

The reel-drive mechanism 09 further comprises a reversing wheel 15, which is constantly in mesh with the secondary coupling wheel 10. In the case of reverse operation this reversing wheel 25, as is shown in FIG. 3, can drive the REV reel disc 12b via the intermediate wheel 17 and the pivotal wheel 16.

One arm of the two-arm bypass lever 58 carries the bypass wheel 57 and the other arm 58c of the bypass lever 58 carries an actuating pin 58a, which engages a guide profile 39a of the head support 39. This guide profile 39a is constructed as a continuous guide path comprising an upwardly inclined left-hand path section 39aa, which bends to the left in the drawing, and a rectilinear flat return path section 39ar, the ends of the path sections being interconnected. The actuating pin 58a can move around in the guide profile 39a. When the head support 39 is moved from the play position into the fast-winding position the actuating pin 58a will pass through the lefthand path section 39aa, the actuating pin 58a being moved to the left and the bypass wheel 57 being pivoted against the primary and the secondary coupling wheel 9 and 10. When the head support remains in this position the bypass wheel 57 provides a bypass connection between the primary and the secondary coupling wheel 9, 10. Since the transmission from the primary coupling wheel 9 to the secondary coupling wheel 10 via the bypass wheel has been selected in such a way that the secondary coupling wheel 10 can rotate with a higher speed this drive configuration enables a rapid rotation of the reel discs 12a, 12b to be achieved. This rapid rotation can be fast forward winding (FFW) or fast reverse winding (FRW).

Figure 3:
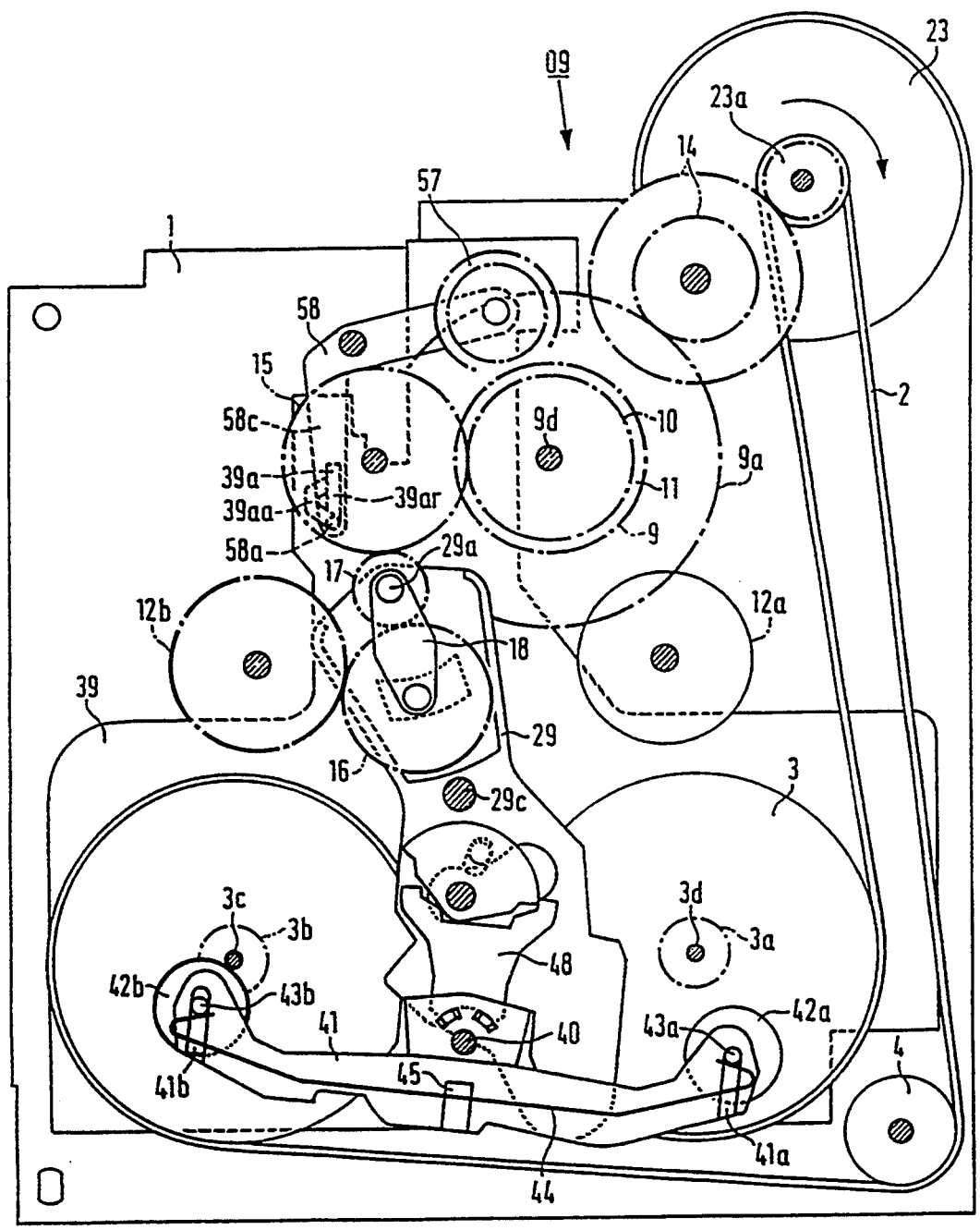

Whereas FIG. 1 illustrates the play mode in the forward direction, FIG. 3 illustrates the play mode in the reverse direction (REV). FIG. 3 shows that the switching lever 29, which is pivotable about the pivot 29c, has been pivoted anti-clockwise. In this position the intermediate wheel 17 is in mesh with the reversing wheel 15. Thus, the motor 23 drives the REV reel disc 12b in the REV direction via the motor shaft 23a, the intermediate drive wheel 14 and the toothed drive ring 9a of the primary coupling wheel 9, which rotates constantly clockwise in the same direction. The primary coupling wheel 9 drives the secondary coupling wheel 10 via the friction coupling 11. The secondary coupling wheel 10, in its turn, drives the reversing wheel 15, which rotates the REV reel disc 12b clockwise via the intermediate wheel 17 and the pivotal wheel 16.

In the present case of REV operation the meshing forces act on the individual toothed wheels in such a way that the pair REV reel disc 12b/pivotal wheel 16 is engaging and the pair REV wheel 15/intermediate wheel 17 is disengaging. The switching lever 29 is urged anti-clockwise by the switching-lever spring. The spring load is such that the switching lever 29 is pressed to the left against the meshing forces.

In the REV play mode as illustrated in FIG. 3 the bypass wheel 57, is disengaged from the primary coupling wheel 9 and the secondary coupling wheel 10, so that both coupling wheels are coupled to one another only via the coupling 11, i.e. with the possibility to slip.

To proceed from the play direction in FIG. 1 to the other play direction in FIG. 3 the drive should be reversed. This reversing process is effected automatically in the play mode or in the fast-winding mode at the end of the tape, when the tape transport stops. However, reversal is also possible by pressing a button.

The deck has a head support 39 carrying a magnetic head, not shown. A pressure-roller bracket 41 is pivotably mounted on a spindle 40 of the head support 39 symmetrically relative to the capstans 3c, 3d. The pressure-roller bracket 41 extends to both sides from the spindle 40 towards the capstans 3c, 3d and has a U-shaped profile with a base and two flanges. At its ends the pressure-roller bracket 41 has longitudinal slots 41a and 41b in the flanges, in which slots the ends 43a and 43b of the spindle 43 of the pressure rollers 42a, 42b are movable. The longitudinal slots 41a and 41b are situated at opposite sides of spring arms 44a and 44b of a pressure spring 44.

The pressure spring 44 consists of a steel strip secured in a clamping member 45 in its centre and bifurcating at its ends to form the spring arms 44a/b.

The spring arms 44a/b of the pressure spring urge the pressure rollers 42a/b in the slots 41a and 41b towards the capstans 3c and 3d. The spring arms 44a/b of each spring arm pair 44a or 44b thus press individually against the spindle ends 43a, 43b and thereby align the pressure rollers 42a, 42b. The free ends of the spring arms 44a/b are bent to form hook-shaped spring portions 44c so as to stiffen the portions of the spring arms 44a/b by which the pressure is exerted.

As a result of the bifurcate spring arms formed on the pressure spring 44 the position of the pressure-roller spindles 46 relative to the capstans 3c, 3d is self-aligning, so that the relevant axes a/ways assume a parallel position. Tilting as a result of any irregularities is not possible.

As a result of this positional alignment of the pressure rollers 42a, 42b the pressure roller surfaces 47 can be right-circular cylindrical or substantially right-circular cylindrical surfaces. Thus, the contact area where the magnetic tape is pressed against the capstan 3c or 3d is substantially linear and is not point-shaped as in the spherical pressure roller surfaces used until now. This results in distinctly more uniform tape tension.

The pressure-roller bracket has a fork 48 which extends between the capstans 3c, 3d towards the pivot 29c of the switching lever 29. Its prongs 48a cooperate with an actuating lever 49 having sliding edges 50 along which the prongs 48a can slide to pivot the pressure-roller bracket 41 into the predetermined pivotal position. The actuating lever 49 is pivotable about a pivot 51 on the chassis. The actuating lever 49 has a longitudinal slot 53 through which a pin 54 of the switching lever 29 extends.

In the situation illustrated in FIG. 1 the pressure roller 42a has been applied to the capstan 3d. The pressure roller 42b has been lifted off the capstan 3c. When the switching lever 29 is pivoted anti-clockwise the actuating lever 49 is also moved anti-clockwise via the pin 54 and the sliding edge 50 is pressed against the righthand prong 48a. This causes the pressure roller 42a to be lifted off the capstan 3d and the pressure roller 42b to be applied to the capstan 3c.

We claim:
1. A magnetic tape cassette apparatus, comprising:
   a) first and second rotatable capstans, said capstans being spaced from each other;
   b) first and second rotatable reel discs, said reel discs being spaced from each other;
   c) a pressure roller bracket and first and second pressure rollers, each pressure roller being rotatably mounted on said bracket for engagement with a respective one of said capstans, said pressure roller bracket being pivotable between a first bracket position in which said first pressure roller rotatably engages said first capstan and a second bracket position in which said second pressure roller rotatably engages said second capstan;
   d) a pivotable switching lever having a first, end portion extending generally between said reel discs and a second, pressure roller bracket actuating portion extending toward an area between said capstans, said first end portion comprising drive means for rotatably driving said reel discs, said drive means including an intermediate wheel rotatably mounted on the switching lever and a pivoting wheel pivotally mounted on said switching lever and in engagement with the intermediate wheel,
      said switching lever being pivotable between a first switching lever position in which said pivoting wheel engages and drives said first reel disc and a second switching lever position in which said pivoting wheel engages and drives said second reel disc,
      said pressure roller bracket further comprising a fork including first and second prongs which extend adjacent said second, pressure roller bracket actuating portion of said switching lever, and
      said pressure roller bracket actuating portion being engageable with said first and second prongs such that when said switching lever pivots from one said switching lever position to the other said switching lever position said actuating portion engages one of said prongs to pivot said pressure roller bracket from one said bracket position to the other said bracket position,
      whereby pivoting of said switching lever between said first and second switching lever position switches (i) the reel disc driven by said drive means, (ii) the position of the pressure roller bracket and (iii) the engagement of said pressure rollers with the respective capstans.

2. A magnetic-tape-cassette apparatus as claimed in claim 1, wherein said pressure roller bracket actuating portion comprises a pivotable actuating lever arranged between the switching lever and the fork of the pressure-roller bracket.

3. A magnetic-tape-cassette apparatus as claimed in claim 2, wherein the actuating lever is pivotable about a fixed pivot and includes a slot, and the switching lever includes a pin which engages the slot in the actuating lever to pivot the actuating lever, during pivoting of the switching lever, to engage a respective said prong of said pressure roller bracket fork.

4. A magnetic-tape-cassette apparatus as claimed in claim 3, wherein the actuating lever has sliding edges along which the prongs slide to pivot the pressure-roller bracket into a pivotal said bracket position.

5. A magnetic-tape-cassette apparatus as claimed in claim 2, wherein the actuating lever has sliding edges along which the prongs slide to pivot the pressure-roller bracket into a position.

6. A magnetic-tape-cassette apparatus as claimed in claim 1, wherein the actuating portion has sliding edges along which the prongs slide to pivot the pressure-roller bracket into a position.

7. A magnetic tape cassette apparatus according to claim 1, further comprising:
- a head support spindle disposed symmetrically relative to said capstans;
- a head support pivotable about said head support spindle and carrying said pressure roller bracket;
- a magnetic head carried on said head support; and
- a pressure spring,
  - said pressure rollers each including a pressure roller spindle and said pressure roller bracket including a pair of slots in which the spindle of each pressure roller is slidable to adjust the position thereof relative to its respective capstan, and
  - said pressure spring has two free end portions each engaging a spindle of a respective said pressure roller for urging said pressure rollers in said slots against a respective said capstan.

8. A magnetic-tape-cassette apparatus as claimed in claim 7 wherein the free end portions are each bent to form hook-shaped spring portions which press against the spindle ends of the pressure-roller spindles.

9. A magnetic-tape-cassette apparatus as claimed in claim 7, wherein the actuating portion has sliding edges along which the prongs slide to pivot the pressure-roller bracket into a position.

* * * * *